July 20, 1937.  E. C. LEACH ET AL  2,087,348
SELF LOADING VEHICLE
Filed June 29, 1934     6 Sheets-Sheet 1
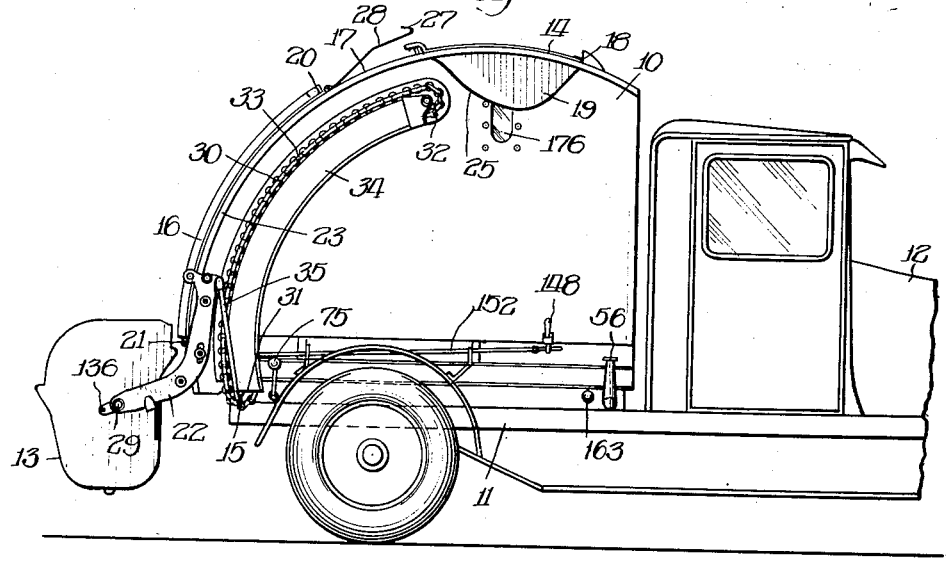
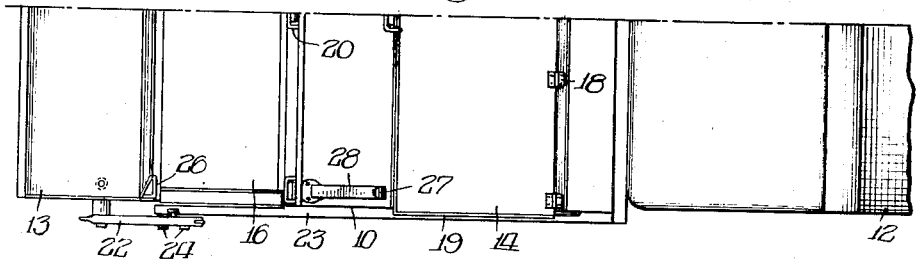
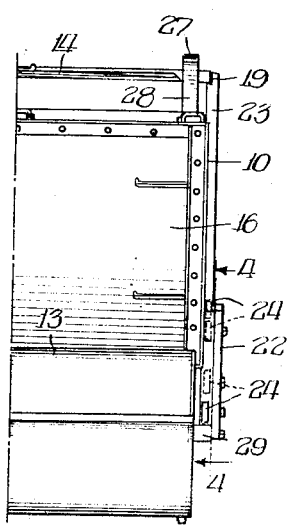
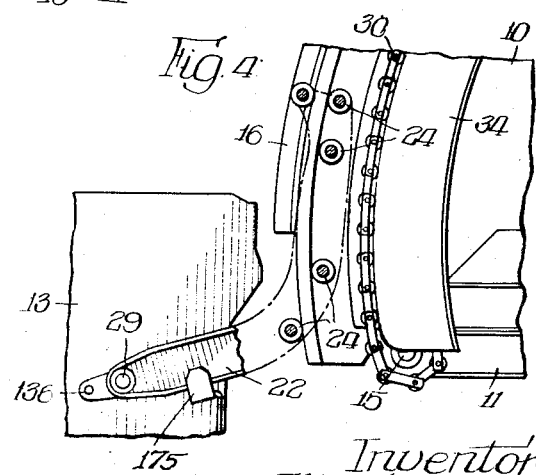
Inventors:
Elbert C. Leach,
Eric O. Hamren.

July 20, 1937.  E. C. LEACH ET AL  2,087,348
SELF LOADING VEHICLE
Filed June 29, 1934  6 Sheets-Sheet 2
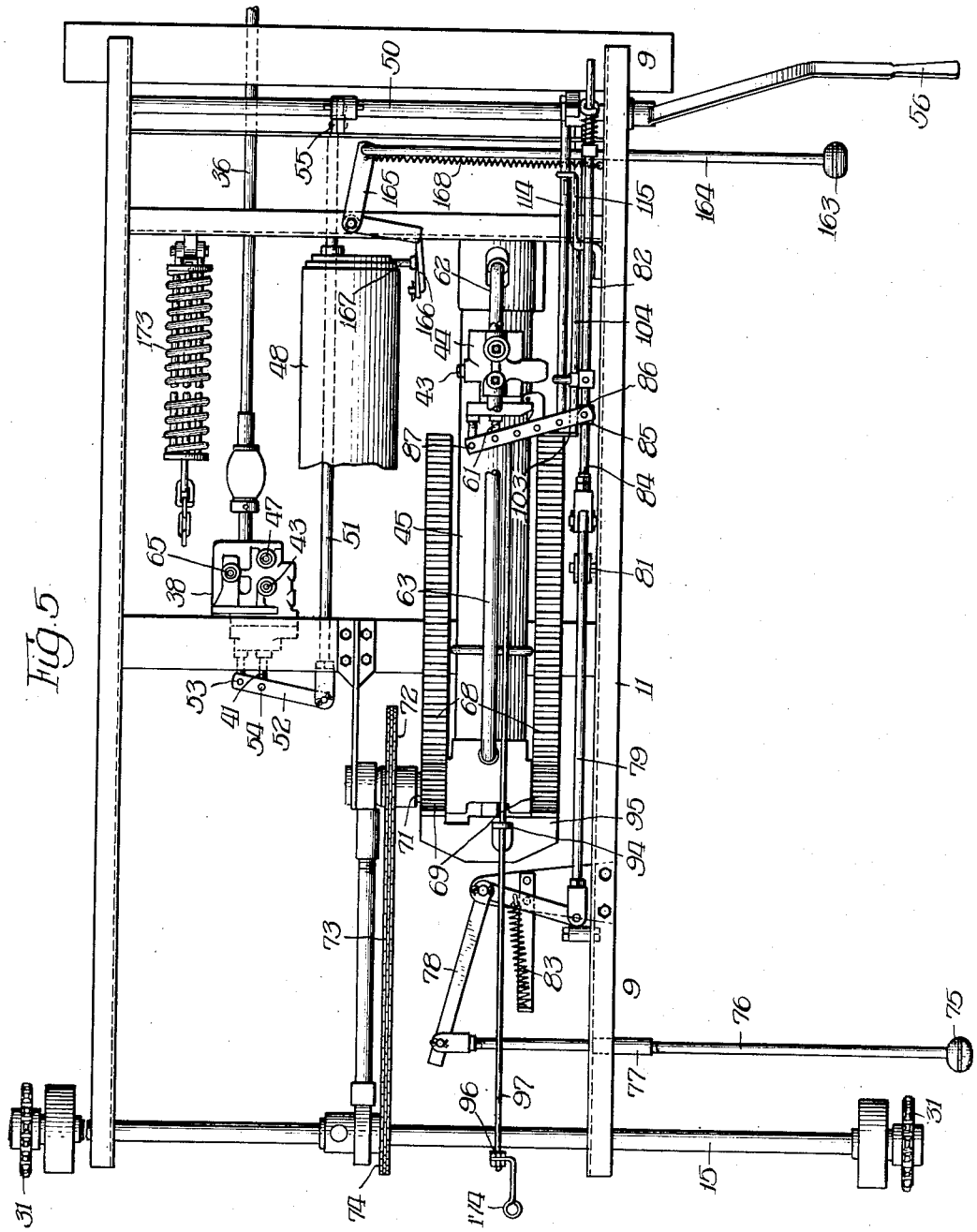
Inventors.
Elbert C. Leach
Eric O Hamren
By Romwell, Greist & Warden, attys.

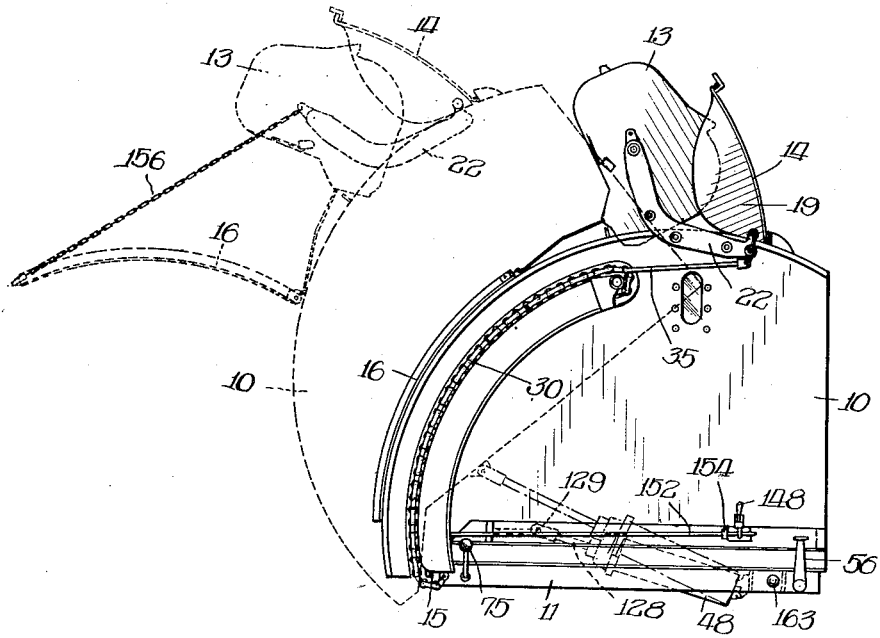
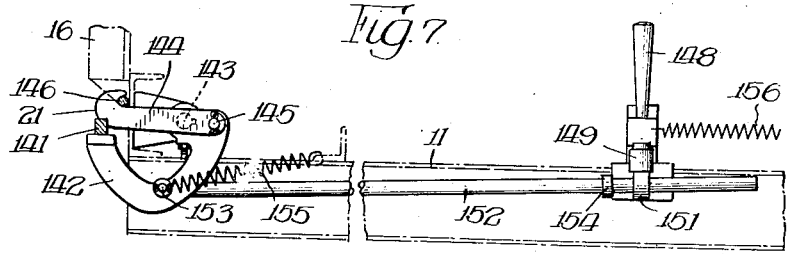
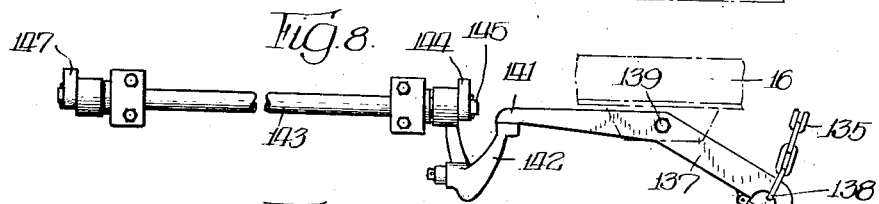
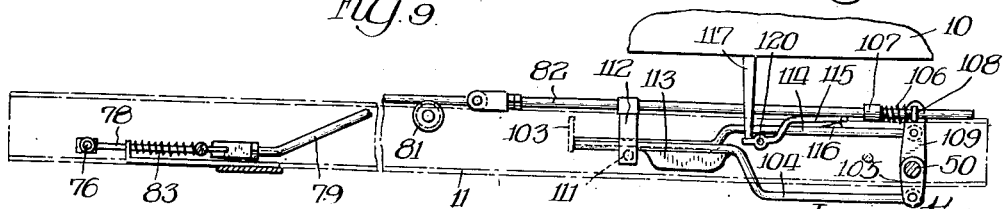

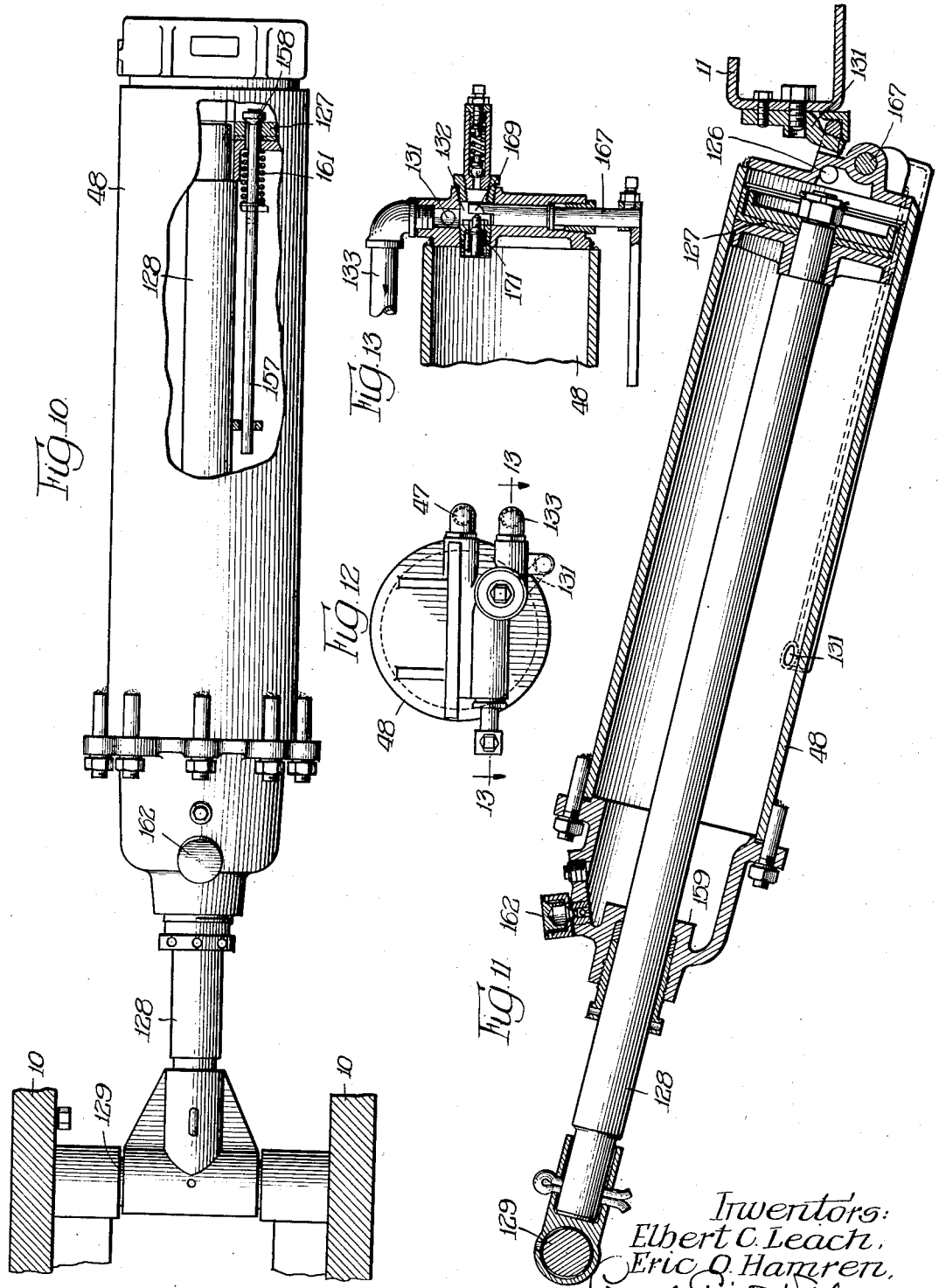

July 20, 1937.        E. C. LEACH ET AL        2,087,348
SELF LOADING VEHICLE
Filed June 29, 1934        6 Sheets-Sheet 5

Inventors:
Elbert C. Leach,
Eric O. Hamren,

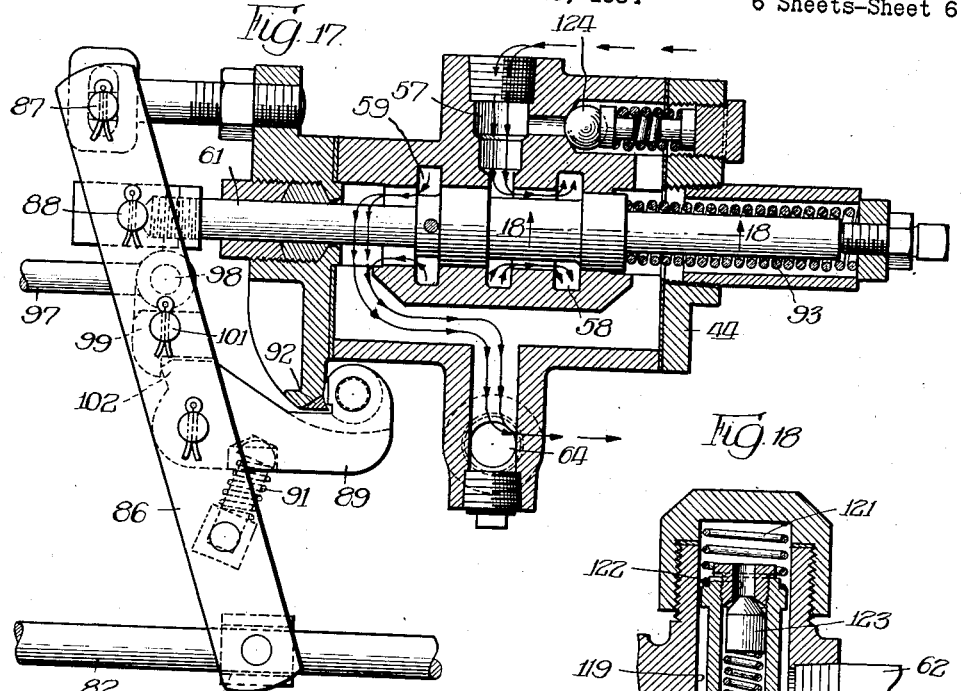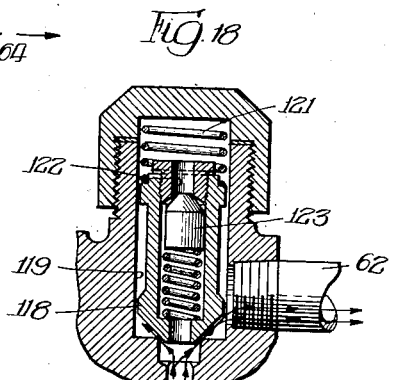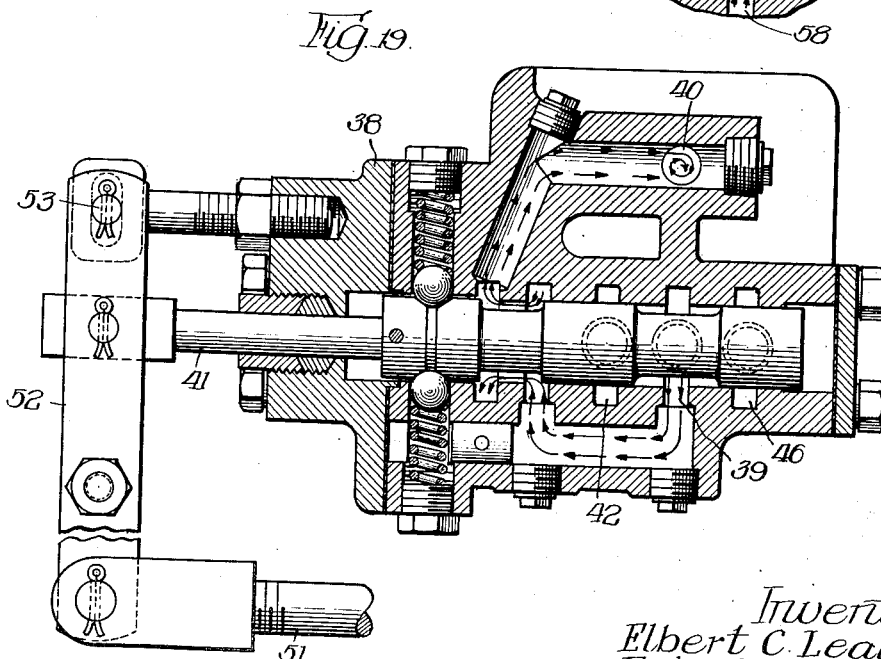

Patented July 20, 1937

2,087,348

UNITED STATES PATENT OFFICE 2,087,348

SELF-LOADING VEHICLE

Elbert C. Leach and Eric O. Hamren, Oshkosh, Wis., assignors, by direct and mesne assignments, of one-half to Leach Company, Oshkosh, Wis., a corporation of Wisconsin, and one-half to The Elgin Corporation, Chicago, Ill., a corporation of New York Application June 29, 1934, Serial No. 733,104

13 Claims. (Cl. 214—67)

The object of this invention is to provide a self-loading vehicle of improved construction and operation for use in the collection of garbage, ashes, rubbish, and other material.

The improved vehicle expedites collection service by relieving the collectors of much of the hard work which is ordinarily considered unavoidable, it enables the garbage or other material being collected to be handled in a strictly sanitary manner, it is neat, compact and attractive in appearance, and it is easy for even an inexperienced laborer to operate. The controls used in dumping the bucket and in emptying the body are simple and foolproof, and the dumping and return of the loading bucket is accomplished automatically and without any waste of time.

While the foregoing statements are indicative in a general way of the nature of the invention, other more specific objects and advantages will be apparent to those skilled in the art upon a full understanding of the construction, arrangement and operation of this new unit.

In the accompanying drawings:

Fig. 1 is a side view of the self-loading unit which forms the subject matter of the invention;

Fig. 2 is a plan view of the unit, with but half of the same shown;

Fig. 3 is a rear end view of the unit, likewise with but half of the same shown;

Fig. 4 is a fragmentary side view of the unit at the location of one of the bucket supporting arms;

Fig. 5 is a plan view of the control mechanisms beneath the body, with the liquid circulating pipes removed for clearness;

Fig. 6 is a side view of the unit, showing the bucket in its raised position and showing the body in full lines in its receiving position and in dotted lines in its dumping position;

Fig. 7 is a side view of the mechanism employed for locking and unlocking the dumping door on the body;

Fig. 8 is a rear view of portions of the same mechanism;

Fig. 9 is a side view of the controls used in operating the bucket and also the body;

Fig. 10 is a plan view of the hydraulic cylinder used in hoisting the body;

Fig. 11 is a longitudinal section through the cylinder;

Fig. 12 is an end view of the cylinder;

Fig. 13 is a section through the same end of the cylinder, taken on the irregular line 13—13 of Fig. 12;

Fig. 17 is a section through the bucket controlling valve;

Fig. 18 is a section through the upper portion only of the bucket controlling valve, at the location of the line 18—18 on Fig. 17; and Fig. 19 is a section through the main control valve.

Figure 14:
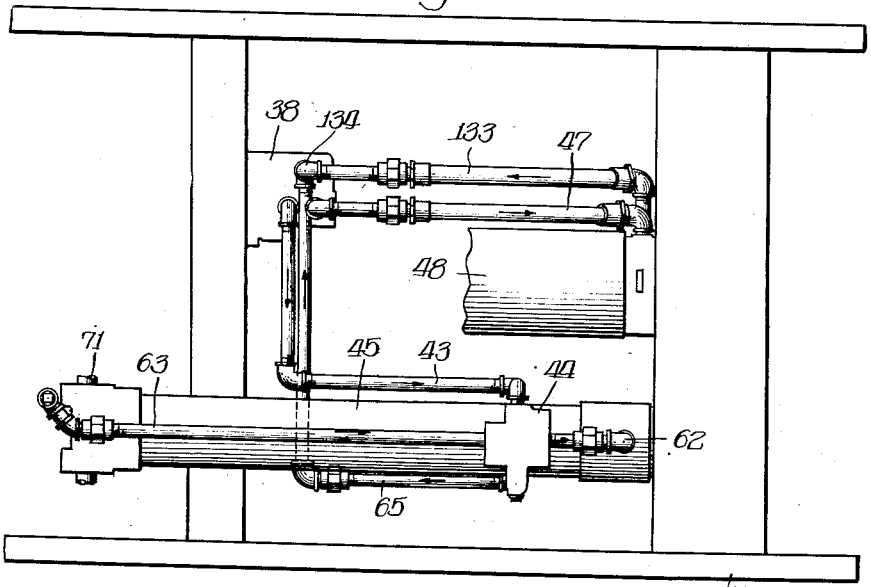
Fig. 14 is a plan view of the liquid circulating system, with the power transmitting mechanisms removed for clearness.

The unit which is shown in the drawings includes a large tank-like body 10 which is mounted on the chassis 11 of a motor truck 12. The garbage or other material to be collected is emptied from the individual containers into a trough-like bucket 13 which is positioned close to the ground at the rear end of the body. After the bucket 13 has been filled it is elevated to the top of the body 10 and dumped into the latter through an opening which is normally closed by a door 14. After the body 10 has been loaded to capacity in this way the vehicle is driven to any suitable point of disposal, where the body is tilted rearwardly on the chassis 11, about the axis of a shaft 15 to which the body is pivotally attached, and the contents discharged through a rear opening which is normally closed by a door 16.

The body 10 is completely enclosed. The front and side walls of the body extend straight up and down, while the top and rear walls are curved and are merged together in a single arcuate surface 17. The loading door 14 is hinged to the body at 18 and is provided at its ends with downwardly extending plates 19, which plates fit against the sides of the body when the door is shut and serve to close off the otherwise exposed gaps at the ends of the door when the latter is open. The discharging door 16 is hinged to the body at 20 and is normally held shut and tightly sealed by a latching device 21.

The bucket 13 is pivotally supported at its ends on arms 22 which are adapted to travel along curved guide rails 23 on antifriction rollers 24 journaled on the arms. The rails 23 are located on the curved edges of the sides of the body and project somewhat beyond the same, being slotted at the ends of the door 14 to receive the end closure plates 19. As the bucket 13, with the arms 22, approaches the closed door 14, the most advanced rollers 24 on the arms engage with curved edges 25 on the plates 19 and cam the door upwardly into its open position. Just before the bucket 13 reaches the location of the door 14, handles 26 on the bucket engage with hooks 27 on the ends of downwardly yielding spring fingers 28 attached to the body and cause the bucket as it continues its forward movement to rotate on its trunnions 29 into an inverted position in register with the opening exposed by the raised door 14, thereby allowing the bucket to dump its contents into the body, with the lip of the bucket projecting down through the opening, and with the ends of the bucket shielded by the overlapping end plates 19 on the door.

The bucket 13 is raised and lowered by means of endless chains 30 which are trained over sprockets 31 and 32 at opposite sides of the body. The lower sprockets 31 are secured to the shaft 15 on which the body is hinged, while the upper sprockets 32 are merely idlers. The chains are caused to travel in arcuate paths concentric with the rails 23 by suitable guides 33, and are enclosed for the most part within guards 34. The chains—which move in one direction when the bucket is being raised and which move in the opposite direction when the bucket is being lowered—are connected to the arms 22 by rigid coupling links 35. The shaft 15 and the lower sprockets 31 are rotated first in one direction and then in the other by hydraulic power transmitting means which will next be described.

The power used in the operation of the unit is obtained from the motor of the truck through a power take-off shaft 36 (see Fig. 5). The shaft 36 drives a rotary pump 37, which pump circulates the oil or other liquid used through the system. The hydraulic system includes two travelers. One is used in elevating the bucket, while the other is used in hoisting the body.

The oil under pressure is delivered by the pump 37 to a main control valve 38 (see Figs. 14 and 19), which valve has three positions. In its neutral position (which is the position illustrated in Fig. 19) it allows the oil which is coming from the pump under pressure through the port 39 to be by-passed back to a port 40 from which it is returned directly to the intake of the pump for recirculation. When the stem 41 of the valve 38 is shifted rearwardly, the by-passing port 40 will be cut off and the oil under pressure will be directed to a port 42 which is connected by a pipe 43 to a valve 44 (see Figs. 14 and 17). The valve 44 is employed to control the flow of oil into and out of the opposite ends of a hydraulic cylinder 45 which is used in elevating the bucket 13. When the stem 41 of the valve 38 is shifted forwardly as far as it will go, the flow of oil to the bucket valve 44 will be shut off and the flow will be diverted instead to a port 46 in the valve 38, which port is connected by a pipe 47 to one end of a hydraulic cylinder 48 which is used in tilting up the body 10.

The pump 37, the valves 38 and 44, and the cylinders 45 and 48, are all rigidly mounted on the chassis 11. The main control valve 38 is operated from a rock shaft 50 (see Fig. 5) which is journaled crosswise on the chassis beneath the front end of the body 10. The shaft 50 is coupled with the stem 41 of the valve by a long rod 51. The rear end of the rod 51 is pivoted to the free end of a short lever 52 which is fulcrumed on the casing of the valve at 53 and pivoted to the stem 41 at 54, and the front end of the rod 51 is pivoted to the lower free end of an arm 55 which is secured to the shaft 50. A crank-shaped handle 56 is provided on one end of the shaft 50 for rocking the same. When the handle 56 is straight up, the valve 38 is in its neutral position; when the handle is swung forwardly (which is the position shown in Fig. 5), oil under pressure will be directed by the valve 38 to the valve 44 which is used in controlling the bucket 13; and when the handle is swung rearwardly, the oil will be directed to the cylinder 48 which is used in tilting up the body 10.

The bucket valve 44 receives the oil under pressure at a port 57 (see Fig. 17) from the pipe 43 and directs the oil either to a port 58 or to a port 59, depending upon the position in which the stem 61 of the valve is placed. The port 58 is connected by a pipe 62 (see Fig. 14) with the front end of the cylinder 45, while the port 59 is connected by a pipe 63 with the rear end of the same cylinder. When the port 58 is in communication with the inlet port 57, the port 59 will be in communication with an outlet port 64, which outlet port is connected by a pipe 65 with the port 40 in the valve 38 which returns the oil to the pump 37 for recirculation, and, conversely, when the port 59 is in communication with the inlet port 57, the port 58 will be in communication with the outlet port 64, through a special flow-restricting device which will later be described.

Figure 15:
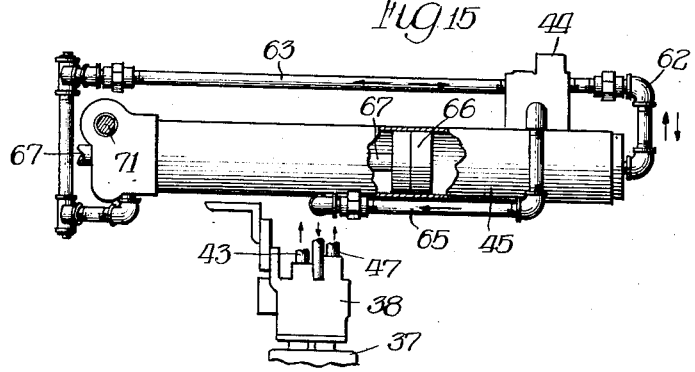
Fig. 15 is a side view of the connections for the bucket operating cylinder.
Figure 16:
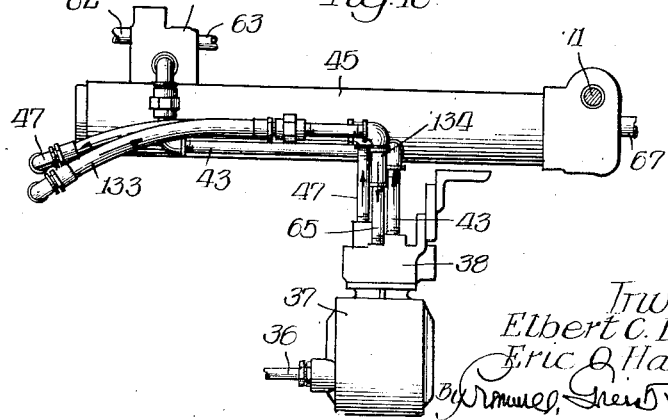
Fig. 16 is another side view of the connections for the same cylinder, from the opposite side.

When the oil is directed by the valve 44 into the front end of the cylinder 45, a piston 66 (see Fig. 15) on a rod 67 in the cylinder will move rearwardly with the rod, causing a double rack 68 which is secured to the rear end of the rod (see Fig. 5) to rotate pinions 69 which are secured to a shaft 71. The shaft 71, which is journaled on the rear end of the cylinder 45 above the rod 67, carries a sprocket wheel 72 which is connected by a chain 73 with another sprocket wheel 74 on the previously mentioned shaft 15. When the piston 66 moves rearwardly the shaft 15 will be rotated in a clockwise direction as viewed in Fig. 1 and the bucket 13 will move upwardly and forwardly in an arc to its dumping position. As the front end of the cylinder 45 is filling with oil, the oil in the rear end thereof will be displaced and will return freely through the pipe 63 to the exhaust port 64 in the valve 44, from which point it will return to the pump 37 through the main control valve 38. Similarly, when the oil is directed by the valve 44 to the rear end of the cylinder 45, the piston 66 will move forwardly, allowing the bucket 13 to return to its lowermost position again.

To operate the valve 44 to cause the loading bucket 13 to start its upward movement, the attendant merely pulls on a knob 75 on the end of a rod 76 (see Fig. 5), which rod is slidably mounted in a tubular guideway 77 carried by the chassis. The outward movement of the rod 76 will oscillate a bell crank lever 78 to which the rod is pivotally attached, and the lever 78 will in turn shift a rod 79 forwardly. The rod 79, which is pivotally attached at its rear end to the bell crank lever and is supported in a horizontal position by an antifriction roller 81, is coupled to another rod 82 which projects forwardly beyond the rod 79 as an extension of the latter. The rod 76, the bell crank lever 78, and the rods 79 and 82 occupy at all times the positions shown in Fig. 5 except when displaced momentarily by the operator in pulling out on the knob 75 to start the bucket, a spring 83 connected with the bell crank lever serving to return the parts immediately to the positions shown in that view as soon as the pull knob is released.

When the knob 75 is pulled by the attendant a shoulder 84 on the extension rod 82 will engage with a collar 85 which is slidably mounted on that rod and will shift the collar forwardly, thereby swinging a lever 86 on the collar into the position shown in Figs. 5 and 17. The lever 86 is fulcrumed on the casing of the valve 44 at 87 and is pivotally connected to the stem 61 of the valve at 88. Consequently, when the knob 75 is pulled by the attendant the valve 44 will be moved into the position shown in Fig. 17, in which position it will direct the oil to the front end of the cylinder 45 and the bucket will commence to move upwardly. As soon as the lever 86 assumes the position shown in Fig. 17 a pivotally mounted latching dog 89 on the lever will move under the action of a spring 91 into latched engagement with a keeper 92 on the casing of the valve, thereby locking the valve stem 61 in the position shown in Fig. 17 against the resistance of a compressed return spring 93 on the stem. The attendant may release the knob 75 as soon as he has operated the valve 44 in this manner, whereupon the extension rod 82 with the abutment 84 thereon will shift rearwardly away from the collar 85 without disturbing the setting of the lever 86.

As soon as the bucket 13 reaches the upper end of its travel and assumes its inverted dumping position behind the raised door 14, an abutment 94 on the yoke 95 which connects the rack sections 68 (see Fig. 5) will move into engagement with a stop 96 on the rear end of a trip rod 97. When this engagement occurs the front end of the rod 97, which is pivoted at 98 to a small plate 99 which is in turn pivoted at 101 to the lever 86 on the valve 44, will engage with a shoulder 102 on the latch 89 and will swing the latter out of engagement with the keeper 92, thereby releasing the lever 86 and allowing the stem 61 of the valve 44 to shift into its rearmost position under the action of the spring 93. When the valve stem 61 reaches its rearmost position the flow of oil through the valve 41 will be changed and the oil under pressure will be diverted to the rear end of the cylinder 45, causing the bucket 13 to right itself and move downwardly again. As the bucket in moving downwardly approaches its lowermost position a stop 103 (see Figs. 5 and 9) on the front end of one of the rack sections 68 will engage with the rear end of a rod 104 which is pivotally connected at its front end to a downwardly extending arm 105 on the rock shaft 59. As the bucket reaches its lowermost position the stop 103 will move the rod 104 endwise and rock the shaft 50 back into its neutral position again, thereby shutting off the flow of oil to the bucket controlling valve 44 and bringing the bucket to rest.

At the time that the attendant pulls on the knob 75 to cause the bucket to start moving upwardly the rock shaft 50 will be automatically turned into the position wherein the oil is directed to the bucket controlling valve by a spring 106 on the rod 82, which spring is positioned between an enlargement 107 on the rod and ear 108 on the outer end of an upstanding arm 109 on the shaft 50. As the extension rod 82 moves forwardly the resistance of the spring 106 will rock the shaft 50 to the desired extent. At the same time that this takes place the rear end of the previously mentioned rod 104 will be automatically lifted out from in front of the stop 103 by a roller 111 on a bracket 112 on the rod 82, which roller will ride under and elevate a cam 113 on the rod 104.

When the bucket 13 is in its lowermost position a locking rod 114 will prevent the shaft 50 from being rocked into a position where it will tilt up the body. This is desirable because the bucket 13 must be raised at least far enough to clear the door 16 before the body 10 can be tilted and dumped. The rod 114 is pivoted at its front end to the arm 109 on the shaft 50 and is disposed with its rear end in register with the stop 103 on the rack 68. Since the stop 103 is positioned in close proximity to the rear end of the rod 114 when the bucket is in its lowermost position, the rod will abut with the stop and prevent the shaft 50 from being rocked into its body-hoisting position until after the bucket has been raised.

Likewise, when the body 10 is in its tilted-up dumping position the attendant cannot make the mistake of running the bucket 13, due to the provision of a latching member 115 which is pivoted at 120 to the chassis. When the body is raised, the front end of the member 115 will drop down over a hook 116 on the rod 114 and will prevent the rod and consequently the shaft 50 from being moved into bucket-operating position, while when the body is lowered, a stud 117 on the bottom of the body will engage with the other end of the member 115 and will automatically tilt the same out of the path of movement of the hook 116.

When the bucket 13 turns over in dumping it remains inverted long enough to become completely emptied, due to the provision of a special retarding valve 118 (see Fig. 18) within the bucket valve 44. This retarding valve is located in a chamber 119 which forms a passageway between the port 58 and the pipe 62 leading to the front end of the cylinder 45. As long as the oil is flowing from the port 58 into the pipe 62 the pressure of the oil will keep the valve 118 unseated against the action of a spring 121 and allow a full flow of the oil, but when the oil is flowing in the opposite direction—which takes place during the lowering of the bucket—the valve 118 will seat and the oil returning through the pipe 62 will be required to pass down through a small duct 122 in the valve 118 before reaching the port 58. The duct 122 is closed at other times by a small spring-pressed valve 123. As the oil under pressure from the pump cannot enter the rear end of the cylinder 45 any faster than the oil is permitted to leave the front end past the retarding valve 118, the rate of flow into and out of the ends of the cylinder is materially slowed down during the return movement of the bucket. The excess of oil delivered by the pump is permitted by a spring-pressed relief valve 124 (see Fig. 17) to pass directly from the port 57 to the port 64 through a connecting duct 125 in the valve 44.

In tilting up the body 10 in order to dump the same, the oil under pressure flows from the main control valve 38 through the pipe 47 to the front end of the cylinder 48, where it enters through a port 126 (see Fig. 11) and acts on a piston 127 in the cylinder, forcing the piston rearwardly. The piston 127 is secured to a piston rod 128 which is hinged at its rear end to the under side of the body 10 by a pivot pin 129. The cylinder 48 is loosely coupled at its front end to the chassis 11 by an anchor plate 131. As the piston 127 is forced rearwardly, the piston rod 128 and the cylinder 48 will swing upwardly together, as shown in dotted lines in Fig. 6, forcing the body 10 to assume a tilted dumping position. During the rearward movement of the piston the oil in the rear end of the cylinder 48 is displaced therefrom and escapes through a conduit 131 (see Fig. 11) which extends lengthwise of the cylinder in the lower wall thereof. The conduit 131 opens at the front end of the cylinder into a small chamber 132 which communicates with a pipe 133. The pipe 133 returns the oil to the valve 38, connecting up with the return pipe 65 from the valve 44 at 134 before reaching the valve 38.

When it is desired to dump the body 10 the attendant takes a short length of chain 135, hooks it onto one of the bucket supporting arms 122 at 136 and onto a small lever 137 (see Fig. 8) at 138, and then runs the bucket 13 up in the usual way into its dumping position. As the bucket goes up, the chain 135 will draw taut and rock the lever 137, which lever is pivotally attached at 139 to the lower edge of the door 16, whereupon the other end 141 of the lever will depress another lever 142 (see Fig. 7) which is secured to a shaft 143 on the chassis. As soon as this occurs, a hook 144, which is pivoted to the lever 142 in a dead center position at 145, will disengage from a keeper 146 on the door and the thusly freed door will move up under the pull of the chain into the dotted line position shown in Fig. 6. Another pivoted hook 146, similar to the hook 144, is eccentrically supported from the shaft 143 at the other end of the latter for latching coaction with the other side of the bottom of the door—both hooks releasing at the same time when the chain 135 becomes taut. The hooks 144 and 147 form a part of the previously mentioned latching device 21.

In order to latch the door 16 again after the body has been lowered and the door closed, it is merely necessary for the attendant to swing a small hand crank 148 rearwardly. The crank 148 is pivotally mounted on the chassis (see Fig. 7) in a convenient location and is provided with an arm 149 which carries a small collar 151. The collar 151 is slidably mounted on a rod 152 which is pivotally connected at 153 to the lever 142, and when the crank 148 is swung rearwardly the collar will engage with a lug 154 on the rod and will shift the latter in the same direction, causing the hook 144 and also the corresponding hook 147 to swing back into their latched dead-center positions against the yielding resistance offered by a spring 155. The crank 148 is normally held in the position shown in Fig. 7 by a small spring 156.

After the door 16 has been opened by attaching the chain 135 and running up the bucket, the body is tilted into the dotted line position shown in Fig. 6 by swinging the handle 56 rearwardly. When the body reaches an angle of about 40° or 45°, a small trip rod 157 on a valve 158 located in the piston 127 of the hydraulic cylinder 48 will engage with a stop 159 (see Fig. 9) in the rear end of the cylinder and will unseat the valve 158 against the yielding resistance of a spring 161, thereby allowing the oil which continues to flow under pressure into the front end of the cylinder through the pipe 47 to pass through the piston and return to the system through the conduit 131 and the pipe 133. This escape of the excess oil from the front end of the cylinder 48 permits the piston 127 to come to rest and thereafter maintains the body stationary in its fully tilted dumping position. Any air which may accumulate in the rear end of the cylinder 48 as a result of repeated hoisting operations may escape through a relief valve 162.

In order to return the body 10 to its lowered receiving position again, the attendant simply swings the handle 56 up into its neutral position and pushes on a knob 163 (see Fig. 5) on the end of a conveniently located rod 164. This rod oscillates a bell crank lever 165 to which it is attached, and the lever in turn pulls on a link 166 which rocks a small shaft 167 in the front end of the cylinder 48. Outward movement of the knob 163 is yieldingly resisted by a spring 168 which is attached to the lever 165. When the shaft 167 is rocked by means of the knob 163 a cam 169 on the inner end of the shaft will unseat a spring-pressed valve 171 in the front end of the cylinder 48 and will allow the oil trapped in the front end of the cylinder to flow back through the return pipe 133. As the oil flows back, a heavy spring connection 173 (see Fig. 5) between the body and the chassis will draw the body down into a position where its weight will cause it to seat solidly on the chassis. After the body 10 has been lowered, the bucket 13 can be brought down by moving the handle 56 forwardly.

It will be understood from the foregoing that all the attendant has to do in order to dump the bucket 13 when the latter is filled, is to pull on the knob 75. When he does this the bucket will move up, the door 14 will open, and the bucket will turn upside down long enough to discharge its contents, then right itself and move down and come to rest in its loading position, all without requiring any attention, direction or guidance on the part of the attendant, who can in the meantime continue with the collection work.

Should the attendant for any reason want to stop the bucket while it is going up and bring it down again, he can do so by merely pulling out on a small handle 174 (see Fig. 5) at the rear end of the body, which handle is located on the end of the trip rod 97 used in reversing the bucket valve 44. Likewise, the attendant can stop the bucket at any place by simply swinging the handle 56 into its neutral position.

After the body 10 has been loaded to capacity, the attendant may dump it, but not until after he has run the bucket up, because when the bucket is down the stop 103 functions as a safety device and prevents the handle 56 from being swung rearwardly into its body-hoisting position. Likewise, when the body is in its tilted position the attendant cannot run the bucket up or down because of the safety lock provided by the latching member 115.

As soon as the bucket 13 has been hooked up with the door 16 by means of the chain 156 and run up far enough to open the door, the handle 56 may be swung into its body-hoisting position. This will cause the body to tilt up and dump. The body will thereafter remain in its dumping position until the attendant pushes on the knob 163, whereupon the body will descend. The chain 156 can then be disconnected and the door 16 locked shut by a movement of the handle 148 far enough to the rear to bring the hooks 144 and 147 back again into their latched dead-center positions.

While the bucket is in its lowered position it is kept from swinging on its trunnions 29 by stops 175 (see Fig. 4) on the ends of the bucket, which stops engage with the arms 22 in such a way as not to interfere with the bucket in turning over while dumping.

The attendant can tell when the body 10 is about filled and ready for dumping by noting the height of the contents through a glass panel 176 in the side of the body.

If desired the bucket 13 may be provided with a hinged cover (not shown) with laterally sliding panels to permit of ready filling, which cover may be hinged to the edge of the bucket in such a way as to swing down into open position when the bucket is being dumped, but a cover of this sort is not at all essential.

We claim:

1. In a self-loading vehicle of the character described, a body having an opening in the upper portion thereof, a bucket, means for elevating the bucket to the opening, a control member, means for causing the bucket upon actuation of the control member to automatically rise, dump its contents into the body through the opening, descend and come to rest, and another control member for stopping the bucket and causing it to descend at any point in the upward movement of the bucket.

2. In a self-loading vehicle of the character described, a body having openings in the upper and lower portions thereof, means for tilting the body to dump the contents through the lower opening, a bucket, means for elevating the bucket to the upper opening, and means for preventing the body-tilting means from being operated while the bucket is in its lowermost position.

3. In a self-loading vehicle of the character described, a body having openings in the upper and lower portions thereof, means for tilting the body to dump the contents through the lower opening, a bucket, means for elevating the bucket to the upper opening, means for preventing the body-tilting means from being operated while the bucket is in its lowermost position, and means for preventing the bucket-moving means from being operated while the body is being tilted up.

4. In a self-loading vehicle of the character described, a tiltable body having an opening in the upper portion thereof for loading and another opening in the lower portion thereof for dumping, a loading bucket, hydraulic means for both tilting up the body and elevating the bucket to the upper opening, and a control member for the hydraulic means operable to cause either the bucket to elevate while the body is not tilted or else the body to tilt while the bucket is elevated.

5. In a self-loading vehicle of the character described, a body having an opening in the upper portion thereof, a bucket at the rear end of the body, arms at the sides of the bucket for supporting the latter, curved guides for the arms on the body extending from the lower portion of the rear end of the body to the opening in the upper portion thereof, chains trained over sprockets adjacent the upper and lower ends of the guides, connections between the chains and the arms, and means for causing the chains to travel in one direction to elevate the bucket and in the opposite direction to lower the bucket.

6. In a self-loading vehicle of the character described, a body having an opening in the upper portion thereof, a hinged door for the opening provided with downwardly extending end flanges, a bucket at the rear end of the body, arms on which the bucket is supported, curved guides for the arms on the body extending from the lower portion of the rear end of the body to the opening in the upper portion thereof, means for moving the arms up and down along the guides, and means for causing the arms as they approach their uppermost positions to engage with the edges of the end flanges on the door and cam the latter open, whereby to permit the bucket to dump its contents into the body through the opening while maintaining the ends of the inverted bucket covered by the end flanges on the door.

7. In a self-loading vehicle of the character described, a tiltable body having an opening in the upper portion thereof for loading and another opening in the lower portion thereof for dumping, a loading bucket at the rear end of the body, a shaft at the rear end of the body on which the same is hinged for tilting, sprockets on the ends of the shaft, other sprockets adjacent the opening in the upper portion of the body, chains trained over the sprockets, connections between the chains and the bucket for moving the latter up and down upon rotation of the shaft, and means for rotating the shaft in either direction.

8. In a self-loading vehicle of the character described, a tiltable body having an opening in the upper portion thereof for loading and another opening in the lower portion thereof for dumping, a loading bucket at the rear end of the body, a shaft at the rear end of the body on which the same is hinged for tilting, sprockets on the ends of the shaft, other sprockets adjacent the opening in the upper portion of the body, chains trained over the sprockets, connections between the chains and the bucket for moving the latter up and down upon rotation of the shaft, and means for rotating the shaft in either direction, a door for closing the lower opening in the body, and means for connecting the door to the bucket whereby to open the door by elevation of the bucket prior to the body being tilted into its dumping position.

9. In a self-loading vehicle of the character described, a tiltable body having an opening in the upper portion thereof for loading and another opening in the lower portion thereof for dumping, a loading bucket at the rear end of the body, a shaft at the rear end of the body on which the same is hinged for tilting, sprockets on the ends of the shaft, other sprockets adjacent the opening in the upper portion of the body, chains trained over the sprockets, connections between the chains and the bucket for moving the latter up and down upon rotation of the shaft, and means for rotating the shaft in either direction, a normally latched door for closing the lower opening in the body, and means for connecting the door to the bucket whereby to open the door by elevation of the bucket prior to the body being tilted into its dumping position, the establishment of said connection serving to automatically unlatch the door.

10. In a self-loading vehicle of the character described, a body having an opening in the upper portion thereof, a hinged door for the opening provided with downwardly extending cam-shaped end flanges, a bucket, guides for the bucket on the body extending from the lower portion of the body to the opening in the upper portion thereof, means for moving the bucket along the guides, and means movable with the bucket for engagement with the end flanges on the door to cam the latter open when the bucket approaches the opening, whereby to permit the bucket to dump its contents into the body through the opening while maintaining the ends of the inverted bucket covered by the end flanges on the door.

11. In a self-loading vehicle of the character described, a rearwardly sloping body having an opening in the upper portion thereof, a bucket at the rear end of the body, arms at the sides of the bucket for supporting the latter, pivotal connections between the arms and the sides of the bucket above the center of gravity of the latter, curved guides for the arms on the body extending from the lower portion of the rear end of the body to the opening in the upper portion thereof, means for moving the arms up and down along the guides, means for tilting the bucket into an inverted position in register with the opening when the bucket reaches its discharging position, and means for limiting the extent to which the bucket can tilt in the opposite direction to an upright position of the bucket when the latter is in its loading position.

12. In a self-loading vehicle of the character described, a body having an opening in the upper portion thereof, a bucket, guides for the bucket on the body extending from the lower portion of the body to the opening in the upper portion thereof, chains trained over sprockets adjacent the upper and lower ends of the guides, connections between the chains and the bucket, means for moving the chains, whereby to elevate or lower the bucket, and means for arresting the movement of one edge only of the bucket as it approaches the opening in the body, whereby to cause the bucket to be inverted into dumping position in register with the opening, said last mentioned means consisting of an upwardly spring-pressed hook on the body.

13. In a self-loading vehicle of the character described, a tiltable body having an opening in the upper portion thereof for loading and another opening in the lower portion thereof for dumping, said body being arcuate in shape between the upper and lower openings and being provided with arcuate side rails which are arranged with their upper and lower ends at opposite sides of said openings, a loading bucket at the rear end of the body, a shaft at the rear end of the body on which the same is hinged for tilting, sprockets on the ends of the shaft, other sprockets adjacent the opening in the upper portion of the body, chains trained over the sprockets, arcuate guides on which the chains are supported in uniformly spaced relation to the side rails, arms on the bucket provided with rollers in engagement with the upper and lower surfaces of the side rails, links pivotally connected between the arms and the chains for moving the bucket up and down upon rotation of the shaft, and means for rotating the shaft.

ELBERT C. LEACH.
ERIC O. HAMREN.